Oct. 26, 1937.    T. E. PRAY    2,096,997
CUTTER BAR AND CUTTER CHAIN
Filed Oct. 16, 1935
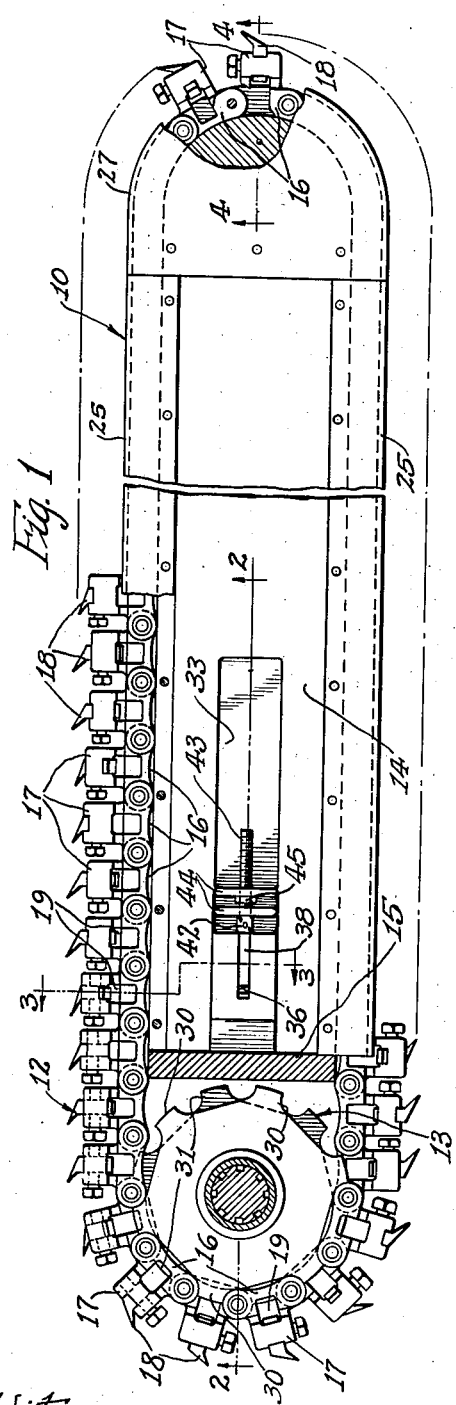
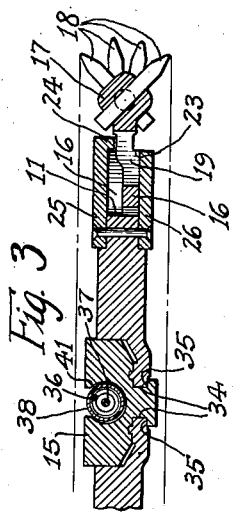
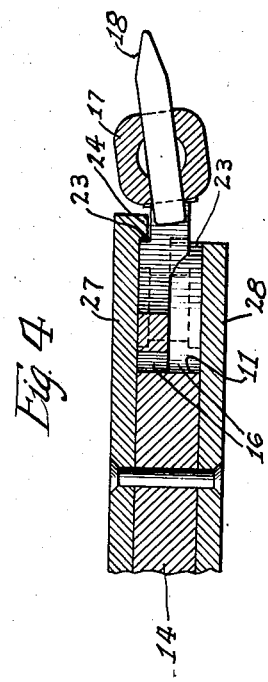
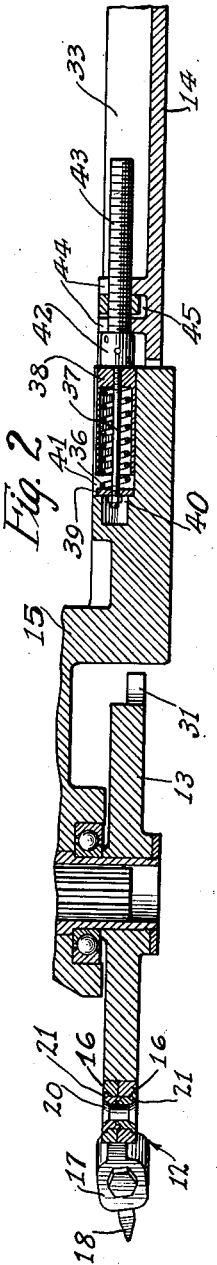
Inventor:
Thomas E. Pray
Attorney.

Patented Oct. 26, 1937

2,096,997

UNITED STATES PATENT OFFICE 2,096,997

CUTTER BAR AND CUTTER CHAIN

Thomas E. Pray, Chicago, Ill., assignor to Goodman Manufacturing Company, Chicago, Ill., a corporation of Illinois Application October 16, 1935, Serial No. 45,248

6 Claims. (Cl. 262—30)

This invention relates to improvements in kerf-cutting mechanisms particularly adapted for use with mining machines of the coal cutting type and has among other objects to provide a new and improved form of cutting mechanism designed in a novel manner to efficiently cut thin kerfs.

As heretofore constructed, cutter bars and chains designed for cutting thin kerfs have been made without the usual gibs for holding the chain in the bar as it moves thereabout in order to maintain a chain cross section sufficient to withstand the heavy stresses imposed during cutting and still enable the thickness of the bar and chain to be retained to the minimum required for cutting such kerfs. Cutter chains so constructed frequently jump the guides in the cutter bars unless continually tightened. When the cutter bar is adjusted the proper amount to prevent the chain jumping from the guides when the machine is cold, the chain will tighten during running to such an extent as to retard the efficiency of the machine and stall the drive motor at times.

One of the objects of my invention is to remedy these difficulties in a novel and simple manner by providing a cutter bar which is yieldable longitudinally and by providing one gib on this bar which engages the upper surfaces of alternate chain blocks and forms a guide for the chain in such a manner as to retain the minimum dimensions of the bar and blocks. Another object of my invention is to so arrange the cutter bar as to permit the chain to clear the guides from debris during the cutting operation.

My invention may best be understood by reference to the accompanying drawing wherein:

Figure 1 is a plan view of a cutter chain and cutter bar with parts broken away and shown in section to more clearly illustrate certain details of my invention;

Figure 2 is an enlarged sectional view taken substantially along line 2—2 of Figure 1;

Figure 3 is an enlarged sectional view taken substantially along line 3—3 of Figure 1; and Said cutter bar includes a bar or plate 14 having suitable guide plates secured to the top and bottom surfaces thereof, which will hereinafter be more fully described, and forming the guide 11. Said plate is adapted to be slidably mounted on a support member 15 which may extend from a mining machine of any suitable construction (not shown).

The cutter chain 12, as herein shown, comprises a plurality of links 16, 16 having bit receiving blocks 17, 17 extending therefrom. Said blocks form a support means for projecting cutter bits 18, 18 in the usual manner. Said links and blocks are provided with suitable openings 19, 19 in the central portion thereof to enable said bits to be readily removed from said blocks when wedged therein.

As shown in Figures 1 and 3, the bits 18, 18 are disposed in varying angular relations with respect to each other so that certain bits which will be referred to as top and bottom bits may cut a kerf of greater thickness than said cutter chain and cutter bar and so that certain other bits may cut the space between these top and bottom bits.

It should herein be noted that as a novel feature of my invention I show said cutter chain as being so formed that the links 16, 16 are pivotally connected together in staggered or offset relation with respect to each other; that is, when the chain is arranged to cut in a horizontal plane, one link has two other links abutting its upper surface and pivotally connected to opposite ends thereof by means of suitable rivets 20, 20 extending through interlocking bushings 21, 21 journaled within said links. These adjoining links in a like manner have their under surfaces abutted by corresponding chain links and pivotally connected thereto in the aforementioned manner.

Thus, a chain having bits extending in four angular positions with respect to the cutter bar may be obtained with four blocks having bits disposed in two different angular positions with respect to a plane extending through the center of said chain by reversing the position of said plates 25, 25 secured to opposite sides of the top surface of the plate 14 and a similar gib extending inwardly from an upper head plate 27 secured to the top surface of the forward end of the plate 14 and forming an arcuate guide around the forward end of said cutter bar. In a like manner lower guide plates 26, 26 and a lower head plate 28 are secured to the under surface of the plate 14. Said last-mentioned guide plates and head plate are similar to the guide plates 25, 25 and head plate 27, with the exception that they do not have the inwardly extending gibs thereon and terminate at the outer edges of the links 16, 16. Said upper and lower guide plates, together with said head plates, form the channeled guide 11 within which said cutter chain moves.

It should here be noted that the lower guide plates 26, 26 and head plate 28 terminate at the outer edges of the links 16, 16, so that coal or other fine material which is likely to enter the channeled guide 11 will be expelled from said guide over the edge of the lower guide plate and by the cutter chain. Thus a cutter bar and chain having the advantages of the usual gibbed construction has been provided which overcomes the disadvantages of such a construction in that the bar is arranged so the cutter chain may clear its guide channel of debris in a simplified manner and prevent clogging of this channel.

Referring now particularly to the sprocket 13 for driving the cutter chain 12 about the cutter bar 10, said sprocket, as shown in Figure 1, includes a plurality of spaced upper teeth 30, 30 arranged alternately with spaced lower teeth 31, 31. Said upper teeth are adapted to engage the upper surface of the lower links 16, 16 and the ends of the upper links 16, 16 and said lower teeth are adapted to engage the lower surface of said upper links and the ends of said lower links. Thus, the thickness of said links has been cut down by eliminating recesses within the links which are adapted to be engaged by the sprocket teeth and by so arranging the links that they may form a gripping means for the sprocket teeth.

Referring now to the novel means for supporting the cutter bar for longitudinal yieldable movement, said cutter bar, as herein shown, has a recess 33 extending longitudinally therealong from the rearward end thereof for a portion of its length. The forward end of said recess is slotted and is provided with a pair of inwardly extending gibbed tongues 34, 34 which are adapted to slidably engage grooved guides 35, 35 extending along the support 15, as may clearly be seen with reference to Figure 3. The cutter bar may thus be slidably moved with respect to said support member.

Yieldable means are interposed between said support member and cutter bar which include a compression spring 36. Said compression spring encircles a rod 37 threaded within a closed end of a cylindrical member 38. Said compression spring is carried within said cylindrical member and its opposite end abuts a circular plate or disk 39 held on said rod by means of a nut 40. Said cylindrical member is slidably mounted in a socket 41 formed in said support member and extending longitudinally therealong and said plate on the end of said rod abuts a shoulder formed in said socket (see Figure 2).

The closed forward end of said cylindrical member is adapted to be abutted by a head 42 extending rearwardly from the rearward end of an adjusting screw 43. Said adjusting screw extends through spaced-apart cross members 44, 44 extending across the recess 33 formed in said cutter bar. A nut 45 is threaded on said shaft between said parallel-spaced members and is held from rotation in a suitable manner, so that rotation of said adjusting screw in one direction by means of a suitable wrench engaging said head in an ordinary manner will tend to engage the head of said screw with the closed end of said cylindrical member and thus move said cutter bar forwardly with respect to said support member against the compression spring 36 for tightening the cutter chain 12.

It will thus be apparent that when said cutter chain has been adjusted to the proper tension, and this tension is increased, that the compression spring 36 will be compressed which will relieve this excessive tension and permit the chain to run free in its guides.

While I have herein shown and described one form in which my invention may be embodied, it will be understood that the construction and arrangement of the various parts may be changed or altered without departing from the spirit or scope thereof. Furthermore, I do not wish to be construed as limiting myself to the precise construction illustrated, excepting as it may be limited in the appended claims.

I claim as my invention:

1. In a cutting mechanism for mining machines, a cutter chain including a plurality of pivotally connected links having bit-carrying blocks extending therefrom and a cutter bar for supporting said chain, said cutter bar having a channeled guide therein for guiding said chain thereabout in a closed orbital path, and the portion of said guide, which is the upper portion thereof when said chain is arranged to cut in a horizontal plane, having a gib extending inwardly therefrom adapted to engage said links and hold said chain within said guide, and the lower portion of said channeled guide terminating at the outer edge of said links to permit said chain to clean debris from said guide.

2. In a cutting mechanism for mining machines, a cutter chain including a plurality of pivotally connected links having bit-carrying blocks extending therefrom, said links being pivotally connected together in staggered relation with respect to each other so that when said chain travels in a horizontal plane one link has two other links pivotally connected to the top surface thereof adjacent opposite ends thereof, and a cutter bar for guiding said chain in a closed orbital path, said bar having a channeled guide formed in the outer periphery thereof, the upper portion of said guide having a gib extending downwardly from the outer end thereof adapted to engage said upper links and hold said chain within said guide, and the lower portion of said channeled guide terminating at the outer edge of said links to permit said chain to clean debris from said guide.

3. In an apparatus of the class described, a cutter chain including a plurality of connecting links, each of said links having a bit carrying block projecting therefrom, one of said blocks having a bit extending therefrom above the center of said chain and another of said blocks having a bit extending upwardly therefrom at a greater elevation than said first-mentioned bit, said links being connected together in staggered relation with respect to each other so that when said chain travels in a horizontal plane one link has two other links pivotally connected to the top surface thereof adjacent opposite ends thereof, and said links and blocks being so arranged that they may be inverted to form bottom instead of top blocks, a cutter bar for guiding said chain in a closed orbital path, said bar being provided with a channeled guide therealong, and said guide having a gib extending therealong adapted to engage shoulders formed on alternate links and blocks for holding said chain within said guide.

4. In an apparatus of the class described, a cutter chain including a plurality of pivotally connected links having bit carrying blocks extending therefrom, one of said blocks having a bit extending therefrom above the center of said chain and another of said blocks having a bit extending upwardly from said last-mentioned block, said links being arranged in staggered relation with respect to each other so that when said chain travels in a horizontal plane one link has two other links abutting the top surface thereof and pivotally connected thereto adjacent opposite ends thereof, and a cutter bar for guiding said chain in a closed orbital path, said bar having a channeled guide therein, the upper portion of said guide having a gib adapted to engage a shoulder formed on alternate links to aid in holding said chain within said guide, and the lower portion of said channel guide terminating at the outer edge of said links to permit said chain to clean debris from said guide.

5. In an apparatus of the class described, a cutter chain including a plurality of pivotally connected links having bit carrying blocks extending therefrom, said links being arranged in staggered relation with respect to each other so that when said cutter chain travels in a horizontal plane one link has two other links abutting the upper side thereof and pivotally connected thereto, and the next two links have links abutting the lower surface thereof and pivotally connected thereto, and a cutter bar for guiding said cutter chain, said bar being provided with a channeled guide therein, wherein the upper portion of said guide when said chain is arranged to cut in a horizontal plane has a gib extending downwardly therefrom adapted to engage shoulders formed on said upper links, and wherein the lower portion of said guide terminates at the outer edge of said links to permit said chain to clean debris from said guide.

6. In a kerf cutting apparatus, a cutter bar having a channeled guide formed in its outer periphery, an endless cutter chain guided in said guide and including a plurality of interconnected links, each of said links having a bit carrying block projecting therefrom, one of said blocks being so arranged that its associated bit projects to one side of a plane extending through the center of and parallel to the plane of movement of said chain, another of said blocks being so arranged that its associated bit extends angularly upwardly therefrom at a greater angle than the bit in said other block, said links being connected together in staggered relation with respect to each other so that one link has two other links pivotally connected to one side thereof and being so arranged that they may be inverted to extend in either direction from the center line of said chain, each of said blocks having an integrally formed shoulder on one side thereof, and a gib extending along said guide adapted to engage said shoulders on alternate of said blocks.

THOMAS E. PRAY.